United States Patent Office 3,239,666
Patented Mar. 8, 1966

3,239,666
PRODUCTION OF HYDROCARBONS FROM MULTIZONE WELLS
George R. Newton, Tulsa, Okla., and William M. Sackett, Palisades, N.Y., assignors to Pan American Petroleum Corporation, Tulsa, Okla., a corporation of Delaware
No Drawing. Filed Oct. 17, 1962, Ser. No. 231,232
10 Claims. (Cl. 250—83)

This invention relates to producing hydrocarbons from wells which penetrate two or more pay zones and is directed particularly to the production of oil and gas from such wells in a manner such that the production from each zone may be separately determined and/or controlled without maintaining the production from the different zones segregated.

In the production of oil and gas from wells which produce from more than one horizon, both the rules of governmental regulatory bodies, as well as the needs and practices of engineering personnel in charge of the producing operations, require that the production from each separate producing zone of the well be separately determined and controlled. This is because the producing characteristics of the different reservoirs may conflict or differ markedly, and both the gas and the crude oils produced from the different horizons may also differ in ways that make it desirable to keep them separated. It is common practice, therefore, in the case of wells having two or more vertically spaced producing zones, to equip the well with a separate string of tubing extending from the well head to each producing zone and to interpose packers in the well casing between the producing zones in order to segregate the production from each subsurface producing horizon. If commingling of the production from the different zones is desired in subsequent handling, it is permitted only after the separate streams emerging at the well head have been measured and treated as required.

In the case of production from multiple-zone wells which produce primarily natural gas, the gas streams commonly include only a relatively few components compared to crude oils. While the composition of the gas from one horizon may sometimes differ from that from another in an easily determined manner, it quite often happens that the bulk properties of the gas produced from two different horizons in a given well are quite similar. Gas composition measurements on a stream of commingled gas production, therefore, cannot be relied upon to determine or control the production from the individual zones. Therefore, it has been a general practice, the same as with oil production, to equip gas-producing wells with formation-isolating packers and separate tubing strings to maintain the gas streams from the different producing horizons segregated. Such well equipment is expensive both in its initial cost and in its maintenance or repair when subsequently required.

It is accordingly a primary object of our invention to provide a method of measuring and/or controlling the production from a multiple-zone well which avoids the need and expense of maintaining the produced oil or gas streams segregated. Another object is to provide a method of determining from a commingled hydrocarbon stream the relative proportions therein of oil or gas from different producing horizons. Still another object is to provide measurements of oil or gas composition and production of a nature and accuracy capable and sufficient for accurate control measures to regulate the production of each of a plurality of zones. Other and further objects, uses, and advantages will become apparent as the description proceeds.

We have now found, as a result of a great many measurements on gases and crude oils produced from a large number of different producing horizons in different parts of the country, that streams of similar bulk composition but produced from different producing formations commonly have markedly different isotopic compositions. For example, we have measured the isotope ratio of carbon 13 to carbon 12 in the methane from a great many producing formations, and we have found that this ratio is consistent over long periods of time for any given well and, within narrow limits, for all wells of a field producing from a given formation, but may vary markedly between two different producing formations in the same well and between different fields and areas.

In accordance with the practice of our invention, therefore, as soon as possible in the drilling of a well or the development of a field producing from two or more zones, samples of the hydrocarbons are obtained from each producing horizon separately. Isotope measurements on the bulk samples or one or more components of the samples are then performed to establish an isotope ratio value, or a plurality of such values for a corresponding plurality of components, uniquely characterizing each sample. When the well is then subsequently completed, production from the separate horizons is allowed to commingle, and corresponding isotope measurements are made on a sample of the composite stream. From these measurements it is a simple matter to compute the relative contribution of each producing horizon to the stream. If it appears that one horizon is producing more and another less than desired, remedial measures well known in the art can be taken to restrain the production of one or stimulate that of the other, followed by new isotopic ratio measurements on the commingled stream to determine the result of the remedial action.

For the expression of isotope ratios generally and for the ratio of carbon 13 to carbon 12, particularly, an expression is commonly used which corresponds generally to the parts per thousand deviation from a standard, average, or arbitrary ratio value. For the carbon-isotope ratio this expression is $$\frac{\delta C^{13}}{C^{12}} = \frac{C^{13}/C^{12} \text{ sample} - C^{13}/C^{12} \text{ standard}}{C^{13}/C^{12} \text{ standard}} \times 1000$$

Numbers stated as isotope ratios are in fact values of the quantity $\delta$. While the numerical values of $\delta$ may appear to vary through a considerable range, it can be seen that they represent relatively small variations in the overall ratio value. Nevertheless, the technique of measurement, particularly when using modern mass spectographic equipment, is such that these $\delta$ values are quite accurately reproducible, the standard deviation for replicate analyses of the $C^{13}$ to $C^{12}$ ratios being only $\pm 0.05$ in the $\delta$ value.

As the analytical procedures for mass spectrometric measurement of isotope ratio values are well known to those skilled in the art, we will only briefly outline the preferred procedure, which is that followed in obtaining the results given below. Analysis of the carbon isotope ratio of a bulk oil or gas sample, or of a component of it such as methane, starts with combustion by oxygen to convert the carbon to $CO_2$, which is recovered and purified. The purified $CO_2$ is then analyzed in a mass spectrometer especially designed for the purpose, such as a 6-inch, 60° Nier-McKinney type similar to that described in Rev. Sci. Instruments, 21, 724 (1950). The results are corrected as described by Craig in Geochimica et Cosmochimica Acta, vol. 12, pp. 133–149 (1957) and expressed at the per mil ($\delta$) values of deviation from the standard in accordance with the definition of $\delta$ given above.

The standard used was National Bureau of Standards Tentative Isotope Reference Sample No. 22, in the case of the carbon isotopes. In the case of the sulfur isotope rations for crude oils, the δ values for the ratio $S^{34}/S^{32}$ were determined in a similar way on purified $SO_2$ gas. The standard $SO_2$ gas was prepared from reagent grade barium sulfate.

*Examples*

As a practical example, we have accurately measured the carbon-13 to carbon-12 isotope ratio for the gas produced from a dually completed well in Hansford County, Texas. The two producing horizons are known as the Cleveland and the Lower Morrow formations. The methane in the Cleveland formation gas was found to have a δ value of 5.8 while that for the methane in the Lower Morrow gas had a value of 13.8. As an example, it might be assumed that measurements on the commingled produced gases from these two formations would have a typical isotope δ value of 9. The solution of this problem in terms of the percentage gas production from each horizon is then simply the solution of the two simultaneous equations $$5.8x + 13.8y = 9(100)$$

and $$x + y = 100$$

where $x$ and $y$ are the percentages respectively of Cleveland and of Lower Morrow gas in the commingled stream. The solution of these equations shows that the stream is 60 percent Cleveland formation gas and 40 percent Lower Morrow formation gas.

As a further example, mixture of more than two components can be resolved by measuring the isotope ratios of other components in the gases. For example, it is commonly found that the produced gases contain small amounts of nitrogen, and that the isotope ratio of the different isotopes of nitrogen in the nitrogen component of the gas stream varies characteristically with the different streams in a manner analogous to but different from the manner in which the carbon isotope ratios change. For examples, besides the two isotope values utilized above for the Lower Morrow and Cleveland gas, a δ value of 7.0 characterizes methane from the so-called Upper Morrow producing horizon. Relative to an arbitrary standard the δ values for the nitrogen isotopes of the three gas streams are respectively Upper Morrow −6.0, Lower Morrow −3.7, and Cleveland formation −8.1. As an example, it might be found that in the commingled production of gas from these three formations, the carbon isotope value is 8.44. The corresponding nitrogen value of the commingled stream might be found to be −6.36. Letting $x$, $y$, and $z$ respectively represent percentages of Upper Morrow, Lower Morrow, and Cleveland gas, the following equations can be stated utilizing these measurements:

$$7.0x + 13.8y + 5.8z = 8.44(100)$$
$$-6.0x - 3.7y - 8.1z = -6.36(100)$$
$$x + y + z = 100$$

The solution of these three simultaneous equations for the variables gives 20 percent for the Upper Morrow gas, 30 percent for the Lower Morrow gas, and 50 percent for the Cleveland formation gas. Having thus determined the relative contribution of each producing horizon to the commingled stream, if it is desired to alter this relation for any reason, then any of a number of known remedial steps can be taken. If, for example, it is desired to increase the production of one formation relative to the other or others, that formation can be stimulated by any well-known technique such as increasing the number of perforations through the casing opposite the formation, fracturing the formation hydraulically, or treating the formation with acid or other materials to enlarge or open the capillary flow channels. Alternatively, the production of the other horizon or horizons can be reduced by cementing shut some of the perforations, injecting materials which cause partial plugging near the well bore, or, if the formation is the bottom producing formation of the well, setting in the well casing a packer equipped with a flow-regulating choke adjustable and/or removable by wireline tools or the like. As all of these corrective or remedial measures are well known to those skilled in the art of oil and gas production, further details or description is deemed clearly unnecessary.

In order to demonstrate that, contrary to what has been stated by some publications concerning isotope ratios, there are in fact appreciable variations in the isotope δ value for methane from different sources, the following table is presented summarizing measurements we have made.

*Table.—Carbon isotopes in natural gas*

| Field, County, State | Production Zone | Number of wells sampled | Range of $C^{13}/C^{12}$ Values in $CH_4$ (Parts per thousand) |
| --- | --- | --- | --- |
| Keyes Field, Cimarron County, Oklahoma | Basal Morrow | 7 | 12.4–13.0 |
| Boehm Field, Morton County, Kansas | Basal Morrow | 1 | 14.0 |
| Sparks Field, Morton County, Kansas | Basal Morrow | 3 | 13.4–13.8 |
| Taloga Field, Morton County, Kansas | Middle Morrow | 1 | 10.1 |
| Roberts Co., Texas | Upper Morrow | 1 | 7.0 |
| Hansford Co., Texas | Lower Morrow / Cleveland | 1 / 1 | 13.8 / 5.8 } Dual Completion |
| Laverne Field, Harper County, Oklahoma | Morrow / Tonkawa / Chester | 1 / 1 / 1 | 11.1 / 7.0 / 13.5 |
| Mocane Field, Beaver County, Oklahoma | Wolfcamp | 2 | 9.7–9.8 |
| Little Buffalo Basin, Park County, Wyoming | Embar / Tensleep | 1 / 1 | 6.8 / 7.4 } Dual Completion |
| Goldsmith, Clearford, Ector County, Texas | Upper Clearfork / Lower Clearfork | 1 / 1 | 5.1 / 10.1 } Dual Completion |

Analogous to these measurements for natural gas, we have made measurements of the carbon and sulfur isotope ratios for bulk samples of a number of crude oils. These likewise are consistent for any one producing horizon and field but differ markedly for different horizons and fields, so as to demonstrate their utility for determining the proportions of the different oils in a commingled stream. Bearing in mind the precision with which these values can be repeatedly determined, typical δ values we have measured for crude oils are given in the following table.

Table.—Carbon and sulfur isotope values for crude oils

| Field, County, State | Producing Formation | $\delta C^{13}/C^{12}$ | $\delta S^{34}/S^{32}$ |
|---|---|---|---|
| Uinta Basin, Uinta County, Utah | Green River | −1.78 | |
| Eola Field, Garvin County, Oklahoma | Oil Creek | −1.36 | +4.3 |
| Teas Field, Garza County, Texas | Ellenburger | −0.93 | +3.5 |
| Swanson River Field, Alaska | Kenai | −0.20 | −0.2 |
| Kawkawlin Field, Bay County, Michigan | Dundee | +0.65 | −8.8 |
| Redwater Field, Alberta | Woodbend | +0.93 | +10.5 |
| Brook Field, Kimball County, Nebraska | Dakota | +1.27 | −4.7 |
| Lee Harrison Field, Lubbock County, Texas | Leonard | +1.81 | −3.8 |
| McElveen Field, Amite County, Mississippi | L Tuscaloosa | +2.63 | −0.9 |
| Darius Field, Iran | Yamama | +2.94 | +0.2 |
| W. Heidelberg Field, Jasper County, Mississippi | Cotton Valley | +3.65 | |
| Collins Field, Covington County, Mississippi | Rodessa | +3.97 | −7.0 |
| Ansley Field, Hancock County, Mississippi | Dantzler | +5.53 | |
| Wilmington Field, Los Angeles County, California | Puente | +7.11 | +10.4 |
| Dexter Field, Walthall County, Mississippi | L Tuscaloosa | +2.17 | |
| Dexter Field, Walthall County, Mississippi | Dantzler | +4.31 | |

While our invention has been explained with reference to the foregoing specific examples, it is to be understood that these are not to be considered as limiting the invention thereto; but rather its scope is properly to be ascertained from the appended claims:

We claim:

1. A method of measuring production of hydrocarbons from two zones of a multiple-zone well which comprises the steps of obtaining a sample of the hydrocarbons produced by each of said two zones uncontaminated by hydrocarbons produced by the other, analyzing with a mass spectrometer each of said samples for the isotope ratio of an element common to said two zones, simultaneously producing hydrocarbons from said two zones into a commingled stream, obtaining a sample of said commingled stream, analyzing with a mass spectrometer said commingled sample for the isotope ratio of said common element therein, and utilizing the results of said analyzing steps to calculate the percentages of hydrocarbons produced by each of said zones into said commingled stream.

2. A method of measuring production of oil from two zones of a multiple-zone well which comprises the steps of obtaining a sample of the oil produced by each of said two zones uncontaminated by oil produced by the other, analyzing with a mass spectrometer each of said oil samples for the isotope ratio of an element common to said two zones, simultaneously producing oil from said two zones into a commingled stream, obtaining a sample of said commingled oil stream, analyzing said commingled sample with a mass spectrometer for the isotope ratio of said common element, and utilizing the results of said anlyzing steps to calculate the percentages of oil produced by each of said two zones into said commingled stream.

3. A method as in claim 2 in which said analyzing steps comprise measuring with a mass spectrometer the ratio of $C^{13}$ to $C^{12}$ in said samples.

4. A method as in claim 2 in which said analyzing steps comprise measuring with a mass spectrometer the ratios of $S^{34}$ to $S^{32}$ in said samples.

5. A method of measuring production of natural hydrocarbon-containing gas from two zones of a multiple-zone well which comprises the steps of obtaining a sample of the gas produced by each of said two zones uncontaminated by gas produced by the other of said zones, analyzing with a mass spectrometer each of said samples for the isotope ratio of an element in one of the gas components common to said zones, simultaneously producing gas from said two zones into a commingled stream, obtaining a sample of said commingled stream, analyzing with a mass spectrometer said commingled gas sample for the isotope ratio of said element in said component, and utilizing the results of said analyzing steps to calculate the percentages of gas produced by each of said two zones into said commingled stream.

6. A method as in claim 5 wherein said component is methane and said analyzing steps comprise measuring with a mass spectrometer the ratio of $C^{13}$ to $C^{12}$ in said methane.

7. A method as in claim 5 wherein said gas includes nitrogen and said component is nitrogen, and said analyzing steps comprise measuring with a mass spectrometer the ratio of $N^{14}$ to $N^{15}$ in said samples.

8. A method of measuring production of hydrocarbons from three zones of a multiple-zone well which comprises the steps of obtaining a sample of the hydrocarbons produced by each of said three zones uncontaminated by hydrocarbons produced by any other of said zones, analyzing with a mass spectrometer each of said samples for the isotope ratios of two different elements common to said three zones, simultaneously producing hydrocarbons from said three zones into a commingled stream, obtaining a sample of said commingled stream, analyzing with a mass spectrometer said commingled sample for the isotope ratios of said two elements, and utilizing the results of said analyzing steps to calculate the percentages of hydrocarbons produced by each of said three zones into said commingled stream.

9. A method as in claim 8 wherein said hydrocarbon is a natural gas including nitrogen, and said analyzing steps comprise measuring with a mass spectrometer the ratio of $C^{13}$ to $C^{12}$ and the ratio of $N^{14}$ to $N^{15}$ in said samples.

10. A method as in claim 8 wherein said hydrocarbon is oil and said analyzing steps comprise measuring with a mass spectrometer the ratio of a $C^{13}$ to $C^{12}$ and the ratio of $S^{34}$ to $S^{32}$ in said samples.

References Cited by the Examiner

UNITED STATES PATENTS

| 2,609,878 | 9/1952 | Halliburton | 73—155 X |
| 2,983,587 | 5/1961 | May et al. | 23—232 |
| 3,033,287 | 5/1962 | Bond | 166—4 |

RALPH G. NILSON, *Primary Examiner.*